Figure 1:
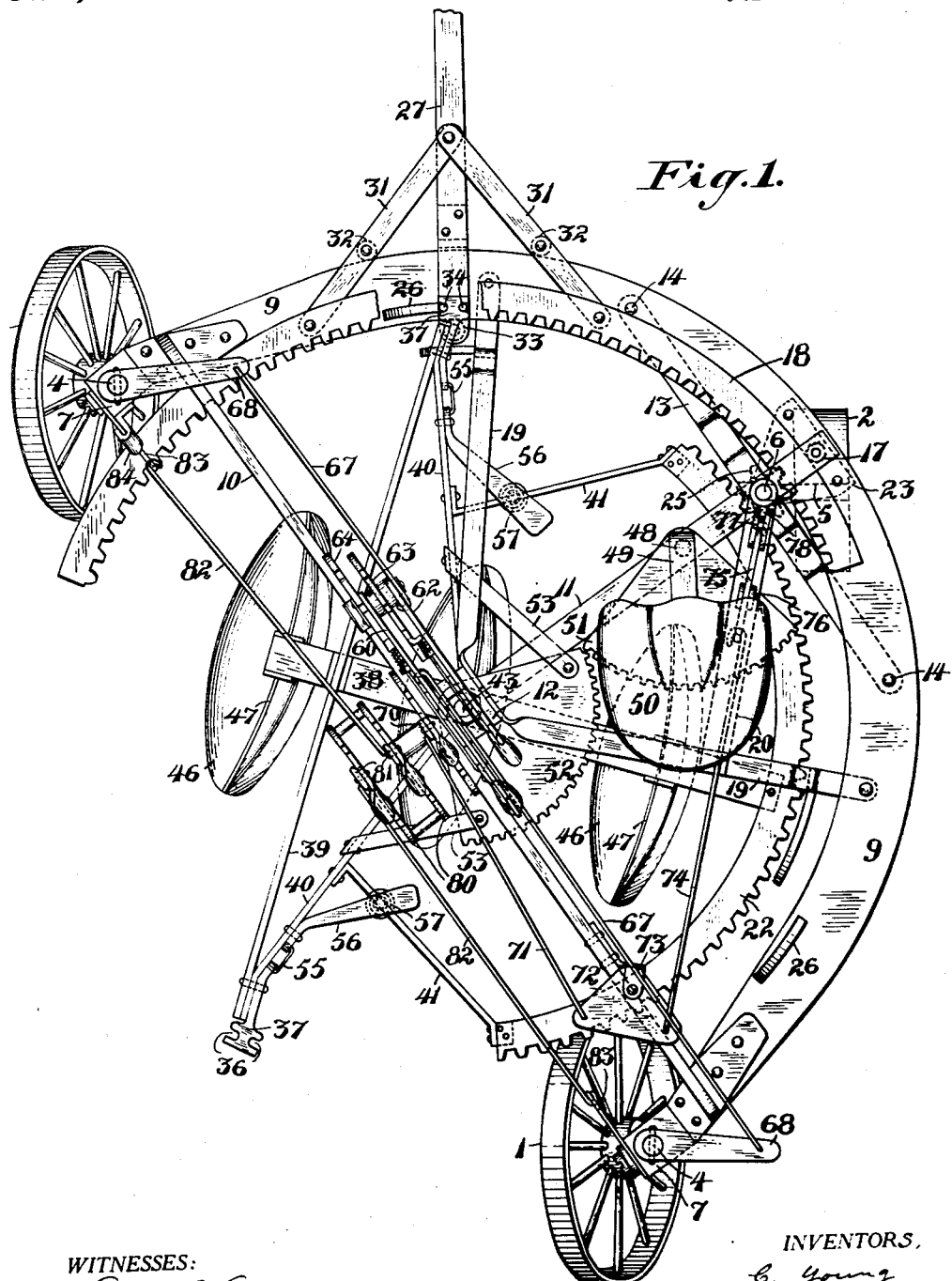

C. & E. G. YOUNG.
SIDEHILL GANG PLOW.
APPLICATION FILED MAY 2, 1908.

929,070.

Patented July 27, 1909.
5 SHEETS—SHEET 3.

Fig. 3.

WITNESSES:
F. C. Fliedner
Nellie B. Keating

INVENTORS,
C. Young
E. G. Young
BY
F. M. Wright,
ATTORNEY.

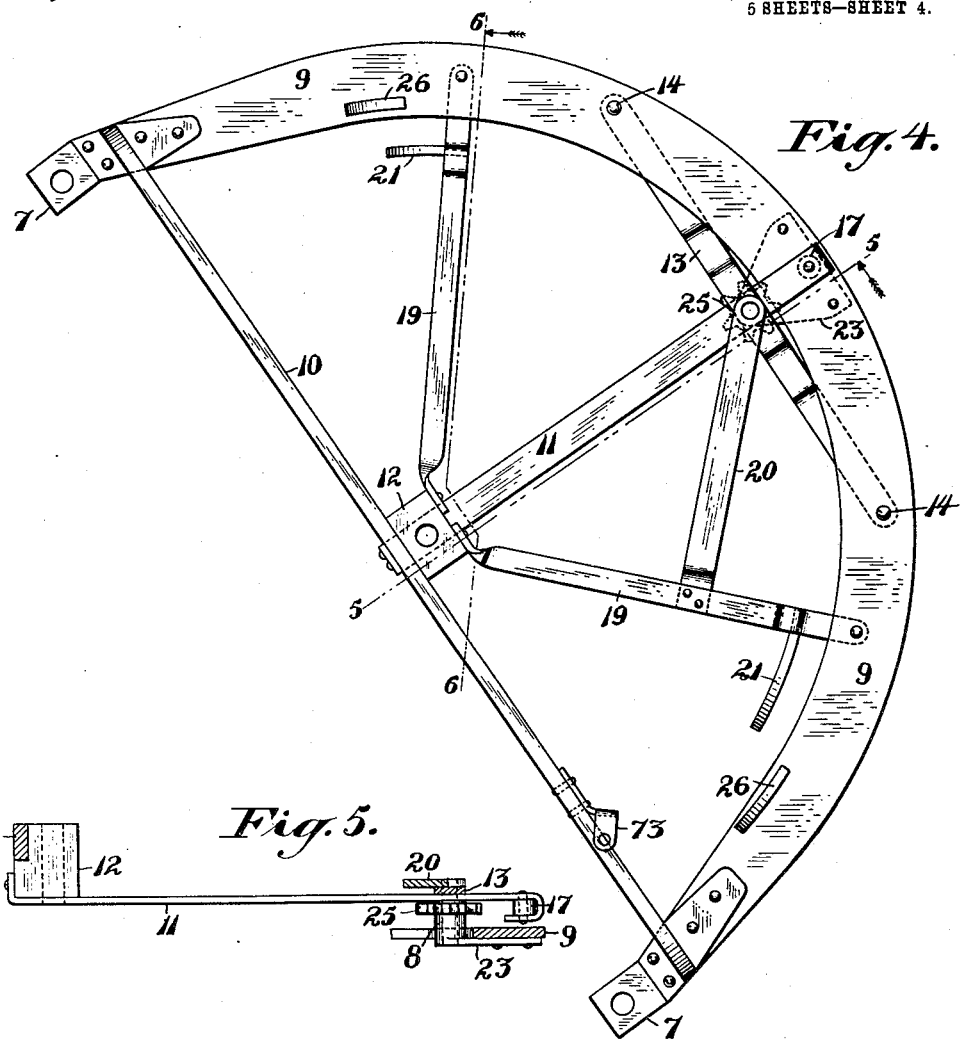

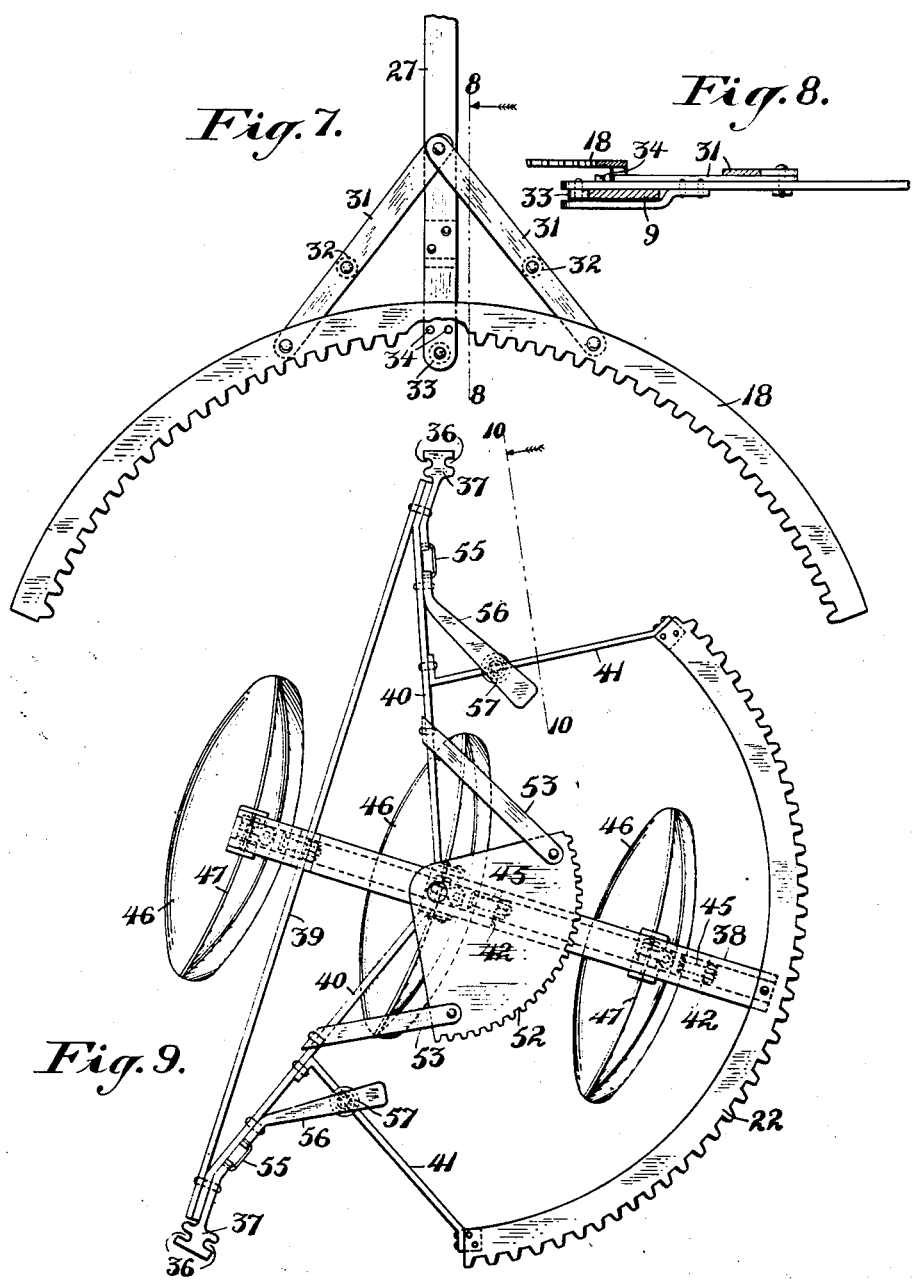

UNITED STATES PATENT OFFICE.

CHESTER YOUNG AND EDWIN G. YOUNG, OF LIVERMORE, CALIFORNIA.

SIDEHILL GANG-PLOW.

No. 929,070.      Specification of Letters Patent.      Patented July 27, 1909.

Application filed May 2, 1908. Serial No. 430,484.

*To all whom it may concern:*

Be it known that we, CHESTER YOUNG and EDWIN G. YOUNG, citizens of the United States, residing at Livermore, in the county of Alameda and State of California, have invented new and useful Improvements in Sidehill Gang-Plows, of which the following is a specification.

This invention relates to a side hill plow, and the object of the invention is to provide such a plow comprising a gang of disks of any number.

In plowing on hill sides, unless the plow can travel continuously in the same direction entirely around the hill, the direction of the plow must be reversed at each arrival at the lim itsof the plowing. Therefore, in so plowing, with the ordinary shear plow, in one half of the "lands" the soil is turned uphill. Such plowing is imperfect, for the following reasons: In beginning the plowing, the first set of furrows which are plowed out are not plowed as deep and as thoroughly as the rest. After the first set of furrows, that part of the ground which the plowman turns uphill is not turned over as well as that part which is turned downhill. Also, in turning uphill the rear end of the plow slides downhill, leaving a small strip of unplowed land between each furrow. Again, in plowing each land, there is formed the full length of the land, a back furrow, raised above the surface of the surrounding soil, and a dead furrow, which leaves a ditch, which is not thoroughly filled up by the subsequent harrowings. Also, in turning uphill, the farmer has to swing his team farther into the part which is plowed, making it harder on the team. At one end of the land, the team has an uphill pull and at the other end a downhill pull, making it harder on the team. Again, in plowing on a hill side, the steeper parts of the hill work up faster than the more gentle slopes, making the team do considerable up and down hill pulling. With the side hill plow, by plowing back and forth on the low places the plowing can be kept level making it much easier on the team.

The object of the present invention is to provide means whereby the land is all turned downhill, leaving a surface with no dead furrows or back furrows.

The scientific way to plow is to turn the ground completely over so that the grass is buried beneath the soil. By doing so, the gases formed by the rotting of the grass are retained in the soil, as well as the non-gaseous products of decomposition. It is also advisable many years to plow the land dry before the rains come, while the land is hard. The disk plow is the only plow able to do this work.

A disk plow which cuts a given width of the ground requires less pull from a team than any plow, cutting the same width, that drags through the ground with a shear and a mold board. Also it turns the ground over better than any other plow, when turning downhill or on the level, but the disk plow does poorer work turning uphill than any other plow, so that any farmer who has to turn his land uphill prefers a heavier and otherwise poorer, plow to do his work in preference to a disk plow. He is also unable to do dry plowing for the same reasons. With our improved reversible-disk side hill plow there is no necessity of using the poorer and heavier plows, or of putting off the plowing until the rains come.

Figure 2:
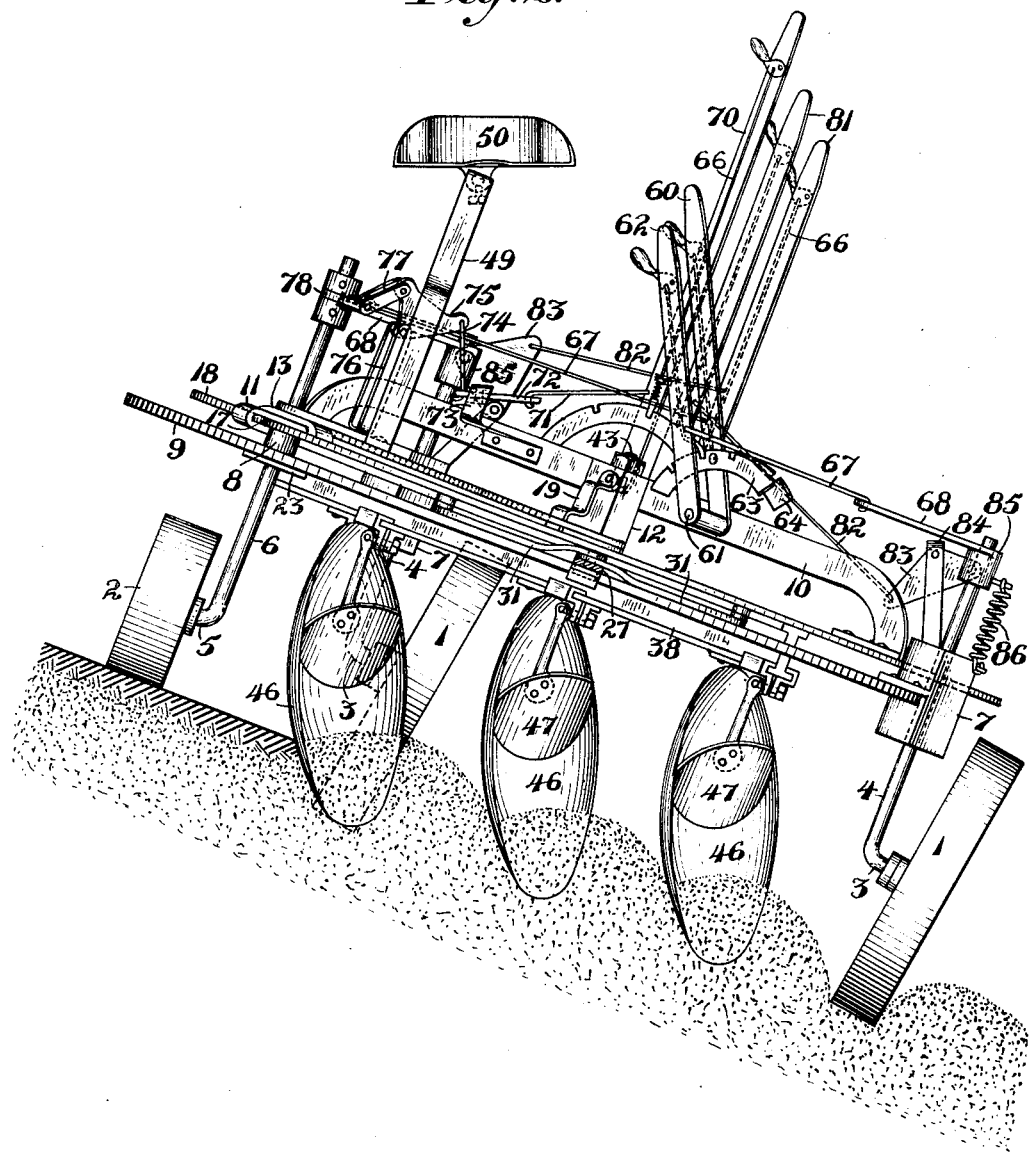

In the accompanying drawing, Figure 1 is a plan view of our improved side hill gang plow; Fig. 2 is a front view of the same; Fig. 3 is a side view; Fig. 4 is a plan view of the wheel frame; Fig. 5 is a vertical section on the line 5—5 of Fig. 4; Fig. 6 is a vertical section on the line 6—6 of Fig. 4; Fig. 7 is a broken plan view of the draft frame; Fig. 8 is a vertical section of the line 8—8 of Fig. 7; Fig. 9 is a plan view of the gang frame; Fig. 10 is a section on the line 10—10 of Fig. 9.

Referring to the drawing, 1 indicates the two furrow wheels, and 2 the land wheel of our improved plow. The furrow wheels rotate on axles 3 bent laterally from the bottom of swivel posts 4, being also bent slightly downward therefrom, so that the furrow wheels are slightly inclined to the vertical, and thereby hold the plow against movement uphill, the furrow wheels being always on the lower side of the plow in plowing. The land wheel 2 is mounted upon an axle 5 bent out, at right angles, from its swivel post 6, which can turn freely. Said swivel posts 4, 6, are adapted to slide vertically in bearings 7, 8, secured on a wheel frame, and can turn only by operating levers, as hereinafter described.

The wheel frame comprises a semi-circular bar 9 and a thin diametral bar 10 arranged with its edges in a vertical plane, its ends being bent at right angles and bolted to the ends of the semi-circular bar 9. It also comprises a central radial bar 11 bent upward at its inner end and secured to a central pivot block 12, said bar 11 being secured near its outer end to a chordal bar 13, the latter being bent downward, at the middle and secured as shown at 14, to the semi-circular bar 9. The end of the central radial bar carries a roller 17, against which moves the outer side of a segmental internal rack 18 hereinafter more fully described. Secured also to said pivot block 12, are two diverging radial bars 19, substantially midway between the central radial bar 11 and the diametral bar 10, the outer ends of said diverging bars being bent downward and secured to the under side of the semi-circular bar. One of these diverging radial bars 19 is connected by a bar 20 to the top of the chordal bar 13. To said diverging radial arms are secured inwardly extending guides 21 between which and the arms the hereinafter mentioned segmental external rack 22 moves. The bearing 8 for the swivel post 6 of the land wheel 2 is secured upon a short plate 23 extending inward, below said central bar, from the semi-circular bar, and said swivel post 6 forms a pivot for a pinion 25 above said bearing 8. Upon said semi-circular bar 9, near its ends, are formed two inclined planes or cams 26, rising from their outer ends and forming shoulders at their inner ends, to form stops for the draft frame, and also to form cams for the latches, as hereinafter described.

The draft frame comprises a tongue 27 having a depending draft bar 28 formed with a number of holes 29 to vary the point of attachment thereto, said depending bar being braced to the horizontal tongue 27 by a brace 30, a segmental internal rack 18 having an angular extension of about 120°, and two oblique braces 31 connecting said tongue with said rack. The frame is also provided with two rollers 32 adapted to roll against the outer edge of the semi-circular bar 9 and one 33 adapted to roll against the inner edge of said bar 9. The tongue 27 moves over the semi-circular bar 9, being arrested at either end by the shoulder formed at the inner end of the inclined plane or cam 26 at that end of the bar. The tongue is also provided at its inner end with raised studs 34, which are adapted to engage notches 36 of a latch 37 at either end of the gang frame, as hereinafter described. The rack 18 meshes with the pinion 25, and, as the draft frame turns about the center of the wheel frame, the segmental internal rack 18 rotates the pinion 25.

The gang frame comprises a segmental external rack 22 extended angularly about 120°, engaging the inner side of the pinion. Said rack is secured at the center to one end of a central bar 38, which extends beneath and beyond the pivot block 12, and is pivoted at its center to said block 12 by a pivot bolt 43. To the other end of the bar 38 is secured a transverse beam 39 connected to the center of the bar 38 by oblique bars 40. The segmental external rack is additionally secured by tie bars 41 to the bars 38, 39, 40. To the sides of the central bar 38, at its middle and ends are secured, in pairs, arms 42, which curve downwardly and carry at their lower ends bearings 44 for the shafts 45 of plow disks 46, each disk being provided with a suitable mold board 47. Pivoted on a vertical pivot 48 on the central bar 11 is a seat frame 49 carrying a seat 50. Said frame has secured thereto a segmental rack 51 which meshes with a segmental rack 52 secured by bars 53 to the gang frame. Thus, as the gang plow turns, the seat frame 49 turns in the opposite direction, thus shifting the seat so that the driver sitting thereon faces in the proper direction.

At the ends of the transverse beams 39 and the oblique bars 40 where they are connected are pivoted two angular latches 37 connected by links 55 with angular levers 56 pivoted upon the oblique bars 40, said levers being sufficiently broad at the top to be adapted to be depressed by the foot, and between said levers 56 and the tie bars 41 are interposed coiled springs 57, normally tending to raise said levers and depress the latches 37. Either latch 37 is adapted to engage the two studs 34 on the tongue 27, and it is in order to raise said latch, to permit it to engage said studs, that the cams or inclined planes 26 are provided, so that, as the tongue approaches the shoulder of a cam, the latch 37 upon the gang frame slides up its inclined surface to such a level that it will drop and engage said studs. To permit the tongue and draft frame to be turned relatively to the wheel frame, the driver releases the latch by depressing with his foot the broad end of the lever 56.

An important feature of the invention is that by means of the latches 37 and the studs 34 the gang frame is locked direct to the draft frame and not through the interposition of the wheel frame. Thereby all strain is taken from the wheel frame, and the parts can be made lighter without injuriously diminishing their strength.

The farmer begins the plowing at the bottom of the hill and plows level "lands" in succession up the hill. After completing any set of furrows, the driver depresses with his foot the front one of two levers 56, thereby releasing the front latch 37 from the studs on the draft frame, and then turns the horses through a semi-circle, carrying with them the draft frame. In the first part of said turning movement, the draft frame moves over the wheel frame, which at that time remains stationary, and, in doing so, the segmental internal rack 18 rotates the pinion 25, which in turn rotates the rack 22 and the gang frame, so that said gang frame also moves through one-third of a revolution, but in the opposite direction to the draft frame and about a common center. After moving through one-third of a revolution, the tongue 27 of the draft frame abuts against the shoulder of the other inclined plane or cam 26 and at the same time the other latch 37 drops into position engaging the studs 34 on the draft frame. The continued movement of the horses, through the remainder of one-half of a revolution, now moves the wheel frame around until the tongue extends reversely to its former direction. This brings the disks into proper position for plowing in the reverse direction. But the furrow wheels are now at an angle with their proper directions for travel. To adjust them so they will travel in the line of the plowing, there is provided a long upright lever 60, pivoted at 61 upon the wheel frame, and a second shorter lever 62. A segment rack 63 is secured to the lever 60 and is used for adjusting the shorter lever 62, a fixed segment rack 64 being used for adjusting the long lever 60. With all segment racks the usual latch bars 66 are provided. Both of said levers 60 and 62 are connected by links 67 with arms 68 keyed to the swivel posts 4 of the furrow wheels. By operating the long upright lever 60, both of said furrow wheels are turned in unison, so as to travel in the line of plowing. However, if desired, the forward wheel can be turned into the line of the plowing, and the rear wheel at a slight angle thereto. This is accomplished by actuating the shorter lever 62, independently of the lever 60, to adjust one wheel relatively to the other.

Before reversing the direction of plowing it is necessary to raise the disks out of the ground. For this purpose means are provided for raising both the gang frame and the wheel frame. These means comprise a long upright lever 70 connected by a link 71 with an inclined bell crank lever 72 pivoted on an upright 73 secured upon the diametral bar 10, said lever 72 being connected by a link 74 with a bell crank lever 75 pivoted on a yoke-shaped upright 76 supported upon the central bar 20, said bell crank lever 75 being also connected by a link 77 with a collar 78 loosely secured around the swivel post 6 of the land wheel. Said long upright lever 70 is also riveted to the two segmental racks 80 of two short upright levers 81. Each short lever 81 is connected by a link 82 to a bell crank lever 83 pivoted on an arm 84 extending obliquely upward from the main frame and connected to a collar 85 around a swivel post 4 of a furrow wheel. By actuating the main lever 70 the gang frame and wheel frame can be raised from all three wheels. However, the parts of the wheel frame adjacent to the furrow wheels can be independently raised or lowered, relatively thereto, by operating one or both of the two short upright levers 81.

In order to permit of the whole apparatus, and the driver supported therein, being easily raised by the power applied by the driver to the lever 70, there are provided springs 86 which partly support the weight of said apparatus upon the respective swivel posts of the wheels, and thus reduce the weight to be lifted by the power applied.

We claim:—

1. In an apparatus of the character described, the combination of a gang frame, bearings thereon for disk plows, a wheel frame to which the gang frame is pivotally attached, a draft frame movable relatively to the wheel frame only about the same pivotal axis as that of the gang frame thereon, and an operative connection between said draft frame and gang frame whereby the gang frame is shifted by the movement of said draft frame relatively to said wheel frame, substantially as described.

2. In an apparatus of the character described, the combination of a wheel frame, a gang frame pivotally mounted upon the wheel frame, bearings therein for disk plows, said wheel frame being formed with a guide in an arc of a circle about said pivotal center, a draft frame provided with rollers engaging said guide, whereby said draft frame is movable relatively to the wheel frame, but only about said pivotal axis as center, and an operative connection between said draft frame and gang frame, whereby the gang frame is shifted by a movement of said draft frame relatively to said wheel frame, substantially as described.

3. In an apparatus of the character described, the combination of a wheel frame, a gang frame and a draft frame both rotatable about a common center on the wheel frame, means whereby the rotation of the draft frame rotates the gang frame, said gang frame having two parts adapted alternately at the ends of its rotary movement to engage a part of the draft frame in the line of draft, said line of draft passing through said common center of rotation, substantially as described.

4. In an apparatus of the character described, the combination of a wheel frame, a pinion rotatably mounted thereon, a gang frame having a segmental rack engaging said pinion, plows supported by the gang frame, and a draft frame having a segmental rack operatively connected with said pinion, whereby, from a rotary movement of the draft frame, is produced a rotary movement of the gang frame, substantially as described.

5. In an apparatus of the character described, the combination of a wheel frame, a rotary gang frame, a rotary draft frame, means whereby a rotary movement of the draft frame produces a rotary movement of the gang frame, and means independently of the first named means for locking either side of the gang frame directly to the draft frame, at either end of its rotary movement, substantially as described.

6. In an apparatus of the character described, the combination of a wheel frame, a draft frame, movable relatively to said wheel frame, a gang frame operatively connected to said draft frame to be moved thereby, a seat frame supported by the wheel frame, and means whereby the seat frame turns with the draft frame, substantially as described.

In testimony whereof we have hereunto set our hands in the presence of two subscribing witnesses.

CHESTER YOUNG.
EDWIN G. YOUNG.

Witnesses:
R. G. SWEET,
M. C. CALLAGHAN.